US011691892B2

(12) United States Patent
Chen et al.

(10) Patent No.: US 11,691,892 B2
(45) Date of Patent: Jul. 4, 2023

(54) Z-TYPE HEXAFERRITE HAVING A NANOCRYSTALLINE STRUCTURE

(71) Applicant: ROGERS CORPORATION, Chandler, AZ (US)

(72) Inventors: Yajie Chen, Andover, MA (US); Li Zhang, Suzhou (CN); Shawn Williams, Burlington, MA (US)

(73) Assignee: ROGERS CORPORATION, Chandler, AZ (US)

( * ) Notice: Subject to any disclaimer, the term of this patent is extended or adjusted under 35 U.S.C. 154(b) by 143 days.

(21) Appl. No.: 17/166,352

(22) Filed: Feb. 3, 2021

(65) Prior Publication Data

US 2021/0261433 A1  Aug. 26, 2021

Related U.S. Application Data

(60) Provisional application No. 62/979,526, filed on Feb. 21, 2020.

(51) Int. Cl.
| | | |
|---|---|---|
| *H01F 1/34* | (2006.01) | |
| *H01F 1/11* | (2006.01) | |
| *C01G 51/00* | (2006.01) | |
| *C04B 35/26* | (2006.01) | |
| *C08K 3/22* | (2006.01) | |

(52) U.S. Cl.
CPC .......... *C01G 51/66* (2013.01); *C08K 3/22* (2013.01); *H01F 1/348* (2013.01); *C01P 2004/04* (2013.01); *C01P 2004/64* (2013.01); *C08K 2003/2265* (2013.01); *C08K 2201/001* (2013.01); *C08K 2201/005* (2013.01); *C08K 2201/01* (2013.01); *C08K 2201/011* (2013.01)

(58) Field of Classification Search
CPC ......... H01F 1/348; H01F 1/11; C01G 49/009; C01G 51/006; C01G 51/68; C04B 35/26; C04B 35/2633; C04B 2235/767; C01F 11/00; C01F 7/02; H01Q 7/06; C01P 2006/42; C01P 2002/52
USPC ............ 252/62.6, 62.57, 62.58, 62.62, 62.63
See application file for complete search history.

(56) References Cited

U.S. PATENT DOCUMENTS

| | | | |
|---|---|---|---|
| 3,020,426 | A | 2/1962 | Van Der Burgt |
| 3,036,007 | A | 5/1962 | Buykx et al. |
| 4,569,775 | A | 2/1986 | Kubo et al. |
| 4,957,812 | A | 9/1990 | Aoki et al. |
| 5,110,651 | A | 5/1992 | Massard et al. |
| 5,494,749 | A | 2/1996 | Kubo et al. |
| 5,591,276 | A | 1/1997 | Yoshizawa et al. |
| 5,593,612 | A | 1/1997 | Lubitz |
| 5,616,414 | A | 4/1997 | Hopstock et al. |
| 6,071,430 | A | 6/2000 | Lebourgeois et al. |
| 6,358,432 | B1 * | 3/2002 | Tomono .................. H01F 1/348 |
| | | | 252/62.63 |
| 6,436,307 | B1 | 8/2002 | Lebourgeois et al. |
| 6,736,990 | B2 | 5/2004 | Aoki et al. |
| 7,348,374 | B2 | 3/2008 | Martinazzo |
| 7,482,977 | B2 | 1/2009 | Kuroda et al. |
| 8,305,281 | B2 | 11/2012 | Suetsuna et al. |
| 8,758,721 | B2 | 6/2014 | Hill |
| 9,596,755 | B2 | 3/2017 | Sethumadhavan et al. |
| 10,071,421 | B2 | 9/2018 | Suetsuna et al. |
| 10,090,088 | B2 | 10/2018 | Suetsuna et al. |
| 10,468,169 | B2 | 11/2019 | Chen et al. |
| 10,766,786 | B2 | 9/2020 | Chen et al. |
| 2003/0091841 | A1 | 5/2003 | Marusawa |
| 2004/0054029 | A1 | 3/2004 | Fujiki et al. |
| 2004/0069969 | A1 * | 4/2004 | Endo .................. C04B 35/2633 |
| | | | 252/62.63 |
| 2007/0231614 | A1 | 10/2007 | Kondo et al. |
| 2009/0057606 | A1 | 3/2009 | Tada et al. |
| 2009/0101873 | A1 | 4/2009 | Tan et al. |
| 2009/0266604 | A1 | 10/2009 | Tetsuji |
| 2009/0297432 | A1 | 12/2009 | Hill |
| 2010/0060539 | A1 | 3/2010 | Suetsuna et al. |
| 2010/0068512 | A1 | 3/2010 | Imaoka et al. |
| 2011/0147643 | A1 | 6/2011 | Ryou et al. |
| 2012/0049100 | A1 | 3/2012 | Yonetsu et al. |
| 2012/0068103 | A1 | 3/2012 | Hill et al. |
| 2012/0085963 | A1 | 4/2012 | An et al. |

(Continued)

FOREIGN PATENT DOCUMENTS

| | | |
|---|---|---|
| CN | 101723654 A | 6/2010 |
| CN | 102486655 A | 6/2012 |

(Continued)

OTHER PUBLICATIONS

Li et al., "Static and dynamic magnetic properties of Co2Z barium ferrite nanoparticle composites", Journal of Materials Science, 40, pp. 719-723. (Year: 2005).*
International Search Report; International Application No. PCT/US2021/016288; International Filing Date: Feb. 3, 2021; dated May 21, 2021; 5 pages.
Su et el., "Low Loss Factor Co2Z Ferrite Composites with Equivalent Permittivity and Permeability for Ultra-high Frequency Applications," Applied Physics Letters, Aug. 2014, vol. 105 No. 062402.
Written Opinion; International Application No. PCT/US2021/016288; International Filing Date: Feb. 3, 2021; dated May 21, 2021; 8 pages.

(Continued)

*Primary Examiner* — Matthew E. Hoban
*Assistant Examiner* — Lynne Edmondson
(74) *Attorney, Agent, or Firm* — Cantor Colburn LLP

(57) ABSTRACT

In an aspect, a $Co_2Z$ ferrite has the formula: $(Ba_{1-x}Sr_x)_3 Co_{2+y}M_yFe_{24-2y-z}O_{41}$. M is at least one of Mo, Ir, or Ru. The variable x can be 0 to 0.8, or 0.1 to 0.8. The variable y can be 0 to 0.8, or 0.01 to 0.8. The variable z can be −2 to 2. The $Co_2Z$ ferrite can have an average grain size of 5 to 100 nanometers, or 30 to 80, or 10 to 40 nanometers as measured using at least one of transmission electron microscopy, field emission scanning electron microscopy, or x-ray diffraction.

20 Claims, 1 Drawing Sheet

(56) References Cited

U.S. PATENT DOCUMENTS

| | | |
|---|---|---|
| 2012/0229354 A1 | 9/2012 | Ishikura et al. |
| 2013/0115160 A1 | 5/2013 | Hill et al. |
| 2013/0292602 A1 | 11/2013 | Hill |
| 2013/0342414 A1 | 12/2013 | Hong et al. |
| 2014/0264145 A1 | 9/2014 | Ray et al. |
| 2014/0291571 A1 | 10/2014 | Kabushiki |
| 2014/0346387 A1 | 11/2014 | Hill et al. |
| 2015/0310971 A1 | 10/2015 | Kmetz et al. |
| 2016/0086700 A1 | 3/2016 | Suetsuna et al. |
| 2016/0086728 A1 | 3/2016 | Suetsuna et al. |
| 2016/0099498 A1 | 4/2016 | Pance et al. |
| 2016/0113113 A1 | 4/2016 | Sethumadhavan et al. |
| 2016/0118171 A1 | 4/2016 | Hill |
| 2016/0276072 A1 | 9/2016 | Sethumadhavan et al. |
| 2017/0098885 A1 | 4/2017 | Hill et al. |
| 2017/0213628 A1 | 7/2017 | Chen et al. |
| 2018/0016157 A1* | 1/2018 | Chen ..................... C04B 35/64 |
| 2019/0013128 A1 | 1/2019 | Chen et al. |
| 2019/0040226 A1 | 2/2019 | Aga et al. |
| 2019/0081377 A1 | 3/2019 | Hill et al. |
| 2019/0264005 A1 | 8/2019 | Horn et al. |
| 2019/0300379 A1 | 10/2019 | Kojima et al. |
| 2019/0318858 A1 | 10/2019 | Chen et al. |
| 2021/0032121 A1 | 2/2021 | Li et al. |
| 2021/0043346 A1 | 2/2021 | Li et al. |
| 2021/0065943 A1 | 3/2021 | Zhang et al. |
| 2021/0179442 A1 | 6/2021 | Chen et al. |
| 2021/0225566 A1 | 7/2021 | Zhang et al. |
| 2021/0246046 A1 | 8/2021 | Chen et al. |

FOREIGN PATENT DOCUMENTS

| | | |
|---|---|---|
| CN | 103304186 A | 9/2013 |
| CN | 104193224 A | 12/2014 |
| DE | 3907220 | 9/1990 |
| EP | 0620571 A2 | 10/1994 |
| EP | 0884740 A1 | 12/1998 |
| EP | 0905718 A1 | 3/1999 |
| EP | 1541641 A | 6/2005 |
| EP | 1652829 A2 | 5/2006 |
| EP | 2214180 A1 | 8/2010 |
| EP | 2784044 A1 | 10/2014 |
| GB | 1105788 A | 3/1968 |
| JP | 62216922 A | 9/1987 |
| JP | H01200605 A | 8/1989 |
| JP | H02120237 A | 5/1990 |
| JP | H09167703 | 6/1997 |
| JP | H09213513 A | 8/1997 |
| JP | H09232123 A | 9/1997 |
| JP | 2000235916 A | 8/2000 |
| JP | 2000277973 | 10/2000 |
| JP | 2001085210 A | 3/2001 |
| JP | 2009155545 A | 7/2009 |
| JP | 6534418 B2 | 6/2019 |
| TW | M417764 | 12/2011 |
| WO | 2012103020 A2 | 8/2012 |
| WO | 2016064459 | 4/2016 |
| WO | 2016123598 A1 | 8/2016 |
| WO | 2017068444 | 4/2017 |
| WO | 2018043943 | 3/2018 |

OTHER PUBLICATIONS

Brando et al., "Microwave Electromagnetic Characteristics of New Substituted M-Hexaferrites BaFe12—2xAxMexO19 (A = Ru, Ir; Me = Co, Zn)", Journal De Physique IV France, Mar. 1997.

Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.

Lee et al. "Role of Small Permeability in Gigahertz Ferrite Antenna Performance," IEEE Magnetics Letter, 2013, vol. 4.

Li et al. "High-frequency magnetic properties of W-type barium-ferrite BaZn2—xCoxFe16O27 composites", Journal of Applied Physics 94, 5918 (2003): https://doi.org/10.1063/1.1618945.

Li et al., "High-Frequency Properties and Attenuation Characteristics of WBa Hexaferrite Composites with Doping of Varius Oxides," Transactions of Magnetics, Feb. 2009, pp. 670-677, vol. 45 No. 2.

Narayanasamy et al., "Influence of Mechanical Milling and Thermal Annealing on Electrical and Magnetic Properties of Nanstructured Ni—Zn and Coblat Ferrites," June 2208, Bull Mater Sci., vol. 31 No. 3, pp. 373-380.

Xu et al., "Structural, dielectric and magnetic properties of Nd-doped Co2Z-type hexaferrites", Jounal of Alloys and Compounds, 509, 2011, pp. 4290-4294.

Allia et al.; "Fe304 nanoparticles and nanocomposites and potential application in biomedicine and in communication technologies: Nanoparticle aggregation, interaction, and effective magnetic anisotropy", J. of Applied Physics 116: 113903 (2014) 10 pgs.

Aoyama et al.; "Preparation and Characterization of Z-type Hexaferrites, Ba3(1-x)Sr3xCo2Fe24O41 with x=0-0.5, via a two-step calcination with an intermediate wet milling"; J.Electroceram; 17; pp. 61-64 (2006).

Bid et al.; "Microstructure Characterization of Mechanosynthesized Nanocrystalling NiFe2O4 by Rietveld's Analysis"; Physica E 39; pp. 175-184; (2007).

Bierlich et al., "Low-temperature sintering and magnetic properties of Sc- and In-substituted M-type hexagonal barium ferrites for microwave applications", Abstract, Feb. 2017 Materials Research Bulletin 86:19-23 ;11 pages.

Boix, Rafael R., et al., "Characteristics of Aperture Coupled Microstrip Antennas on Magnetized Ferrite Substrates", IEEE Transactions on Antennas and Propagation, vol. 53, No. 6, (Jun. 1, 2005), pp. 1957-1966.

Brockman et al. "Nickel-Zinc Ferrite: I, Effect of Composition on the Magnetic Proprties of a Nickel-Zinc-(Cobalt) Ferrite", Journal of the American Ceramic Society, vol. 53, No. 9, Sep. 1, 1970; pp. 517-520.

Cao et al. "Hydrogen-Induced Lateral Growth of Nickel Coating on Ba3Co2Fe24O4, ⁂ Co2Z -Based Hexaferrite during the Electroplating of Multilayer Chip Inductors," Journal of The Electrochemical Society, 2002, vol. 149 issue 12, pp. J89-J92.

Chicinas, I.; "Soft Magnetic Nanocrystalline Powders Produced by Mechanical Alloying Routes"; Journal of Optoelectronics and Advanced Materials; 8(2); pp. 439-448; (2006).

Cruz-Montoya et al., "Synthesis and characterization of polymer nanocomposites containing magnetic nanoparticles"; Journal of Applied Physics 107; 09B506 (2010); 4 pgs.

Dedi et al., "Magnetic properties of cobalt ferrite synthesized by mechanical alloying", AIP Conference Proceedings, 1964; 020003 2018; 5 pages.

Deng, et al; Effect of Bi and Mo Doping on Magnetic and Sintered Characteristics of MgCuZn Ferrite, Journal of Inorganic Materials, 2008, pp. 670-672, vol. 23 No. 4.

EP Supplemental Search Report; EP Application No. 15853114; dated Nov. 21, 2017; 8 pages.

Guo et al. Abstract of "Magnetic Properties of Ir4+ Doped Co2 Z Type Hexagonal Ferrites," Journal of Rare Earths, pp. 220-222, vol. 25, Supplement 2, Jun. 2007; 7 pgs.

Haijun et al., "The preparation and microwave properties of Ba3ZnzCo2-zFe24O41 ferrite by citrate sol-gel process", Materials Science and Engineering, B84, 2001, pp. 252-257

Han et al.; "Microwave-absorption properties of Fe(Mn)/ferrite nanocapsules"; J. Phys. D: Appl. Phys. 42; (2009) 5 pages.

Hansen et al., "Antennas with Magneto-Dielectrics", Microwave and Optical Technology Letters, vol. 26, No. 2, Jul. 2000, pp. 75-78.

Huang et al; "Magnetic epoxy nanocomposites with superparamegnetic MnFe204 nanoparticies"; AIP Advance 5; 097183 (2015); 16 pgs.

Ismail et al.; "Magnetic Properties of Mechanically Alloyed Cobalt—Zinc Ferrite Nanoparticles"; J. Supercond Nov Magn; 27; pp. 1293-1298; (2014).

Kim et al., "Effects of in3+ site occupancy on the magnetic properties of M-type strontium hexaferrites", AIB Advances 10, 015040 (2020); https://doi.org/10.1063/1.5130073; 5 pages.

Koch, C. C.; "Materials Synthesis by Mechanical Alloying"; Annu. Rev. MaterSci. 19; pp. 121-143; (1989).

(56) References Cited

OTHER PUBLICATIONS

Koch, C.C.; "Intermetallic Matrix Composites Prepared by Mechanical Alloying—a Review"; Materials Science and Engineering; A244; pp. 39-48; (1998).

Kong et al., "Ni—Zn Ferrites Composites With Almost Equal Values of Permeability and Permittivity for Low-Frequency Antenna Design," IEEE Transactions On Magnetics, Jan. 2007, pp. 6-9, vol. 43, No. 1

Kristiantoro et al., "Magnetic properties of cobalt ferrite synthesized by mechanical alloying", from AIP Conf 1964, 020003 (2018) Published Online May 15, 2018; 5 pages.

Lee et al., "Low Loss Co2Z (Ba3Co2Fe24O41)—Glass Composite for Gigahertz Antenna Application," Journal of Applies Physics, 2011, vol. 109, 07E530-2.

Li et al.; "Microstructure effects on shock-induced surface jetting"; Journal of Applied Physics 115; 073504 (2014); pp. 11.

Li, Jie, et al. "Structural and magnetic properties of M—Ti (M = Ni or Zn) co-substituted M-type barium ferrite by a novel sintering process," Journal of Materials Science: Materials in Electronics. Chapman and Hall, London, GB; vol. 26; No. 2; Nov. 15, 2014, pp. 1060-1065.

Liu et al.; "Corrigendum: Electromagnetic-wave-absorption properties of wire-like structures self-assembled by FeCo nanocapsules"; J. Phys. D: Appl. Phys. 45; (2012); 7 pages.

Lui, Chaocheng, et al., "Characterizations of magnetic transition behavior and electromagnetic properties of Co—Ti co-substituted SrM-based hexaferrites SrCoxTixFe12-2xO19 compounds,"Journal of Alloys and Compounds, vol. 784, Jan. 11, 2019, pp. 1175-1186.

Mahmood, Sami H., et al. "Modification of the Magnetic Properties of Co$<$sub$>$2$<$/sub$>$Y Hexaferrites by Divalent and Trivalent Metal Substitutions," Solid State Phenomena, vol. 241; Oct. 2015, pp. 93-125.

Mattei et al., "Magnetic and dielectric properties in the UHF frequency band of half-dense Ni—Zn—Co ferrites ceramics with Fe-excess and Fe-deficiency", Journal of Magnetism and Magnetic Materials, Sep. 2017, 8 pages.

Morch et al. "Structure and Magnetic properties of W-type hexaferrites," 2019, IUCRJ, pp. 492-499, vol. 6.

Mou, Fangzhi et al., "Oriented Contraction: A Facile Nonequilibrium Heat-Treatment Approach for Fabrication of Maghemite Fiber-in-Tube and Tube-in-Tube Nanostructures", Langmuir 2010, 26 (19), pp. 15580-15585.

Mu et al., "Improvement of high-frequency characteristics of Z-type hexaferrite by dysprosium doping", Journal of Applied Physics, 109, 123925, 2011, 6 pages.

Narayanasamy et al. "Influence of mechanical milling and thermal annealing on electrical and magnetic properties of nanostructured Ni—Zn and cobalt ferrites", Bulletin of Materials Science, vol. 31, No. 3 Jun. 1, 2008; pp. 373-380.

Ohnuma et al., "Soft Magnetic Properties of FeN/FeBN Multilayers," Journal on Magnetics, Nov. 1992, pp. 896-901, vol. 7 No. 11.

Ohnuma et al.,"Soft Magnetic Multilayers for Micromagnetic Devices,"Journal of Magnetism and Magnetic Materials, 1993, pp. 556-562, vol. 126.

Pal et al.; "Synthesis and magnetic properties of gold coated iron oxide nanoparticles"; Journal of Applied Physics 105; 0713504 (2009); 4 pgs.

Park et al. "Design of Wide bandwidth microwave absorber with Ferrite composites of broad magnetic loss specturm," Advanced Materials Engineering, 2015.

Pasko et al. "Magnetic and Structural characterization of nanosized BaCoxZn2-xFe16O27 hexaferrite in the vicinity of spin reorientation transition," 2011, Journal of Physics: Conference Series 303.

Pullar et al; "Hexagonal Ferrites: A Review of the Synthesis, Properties and Applications of Hexaferrite Ceramica"; Progress in Materials Science; 57; pp. 1191-1134; (2012).

Pullar, "Hexagonal Ferrites: A Review of the synthesis, properties and application of hexaferrite ceramics," Mar. 2012, Progress in Material Science, vol. 57, No. 7, pp. 1191-1334.

Sahoo et al. Enhanced Magnetoelectricity in Bismuth Substituted SrFe12O19 Hexaferrite, Aug. 2019, Journal of Applied Physics, vol. 126, No. 7.

Sahu et al.; "Influence of excess Fe accumulation over the surface of FePt nanoparticies: Structural and magnetic properties"; Journal of Applied Physics 113; 134303 (2013); 1 pg Abstract only.

Sepelak et al.; "Nanocrystalline Nickel Ferrite, NiFe2O4: Mechanosynthesis,Nonequilibrium Cation Distribution, Canted Spin Arrangement, and Magnetic Behavior"; J.Phys.Chem. C; 111; pp. 5026-5033; (2007)

Sepelak et al.; "Structural and Magnetic Properties of Nanosize Mechanosynthesized Nickel Ferrite"; Jounral of Magnetism and Magnetic Materials; 272-276; pp. 1616-1618; (2004).

Sharma et al.; "Ultra Low Loss Soft Magnetic Nanoparticles for Applications Up to S-band," Applied Physics Letters, vol. 103, 112402, Sep. 2013.

Singh et al. "Static Magnetic Properties of Co and Ru substituted Ba—Sr ferrite," 2008, Materials Research Bulletin, pp. 176-184, vol. 43.

Thakur et al, "Low-loss Spinel Nanoferrite with Matching Permeability and Permittivity in the Ultrahigh Frequency Range," Journal of Applied Physics • Jul. 2010, vol. 108.

Thanh Ba Do; "High Temperature Composite Materials and Magnetodielectric Composites for Microwave Application"; Dissertation; University of Michigan; 2010; 223 pages.

Wu et al.; "Studies of high-frequency magnetic permeability of rod-shaped CrO2 nanoparticies"; Phys. Stat. Sol. (a) 204; No. 3; pp. 755-762; 2007.

Yang, Guo-Min, et al., "Miniaturized Patch Antennas with Ferrite/Dielectric/Ferrite Magnetodielectric Sandwich Substrate", Piers Online, vol. 7, No. 7, (Jan. 1, 2011), pp. 609-612.

Yang, Guo-Min, et al., "Novel Compact and Low-Loss Phase Shifters With Magnetodielectric Disturber", IEEE Microwave and Wireless Components Letters, vol. 21, No. 5, (May 1, 2011); pp. 240-242.

Zaher et al.; "Osmotically driven drug delivery through remote-controlled magnetic nanocomposite membranes"; Biomicrofluidics 9; 054113 (2015); 17 pgs.

Zhen et al.; "Microwave absorption properties of FeNi3 submicrometre spheres and SiO2@FeNi3 core-shell structures"; J. Phys. D: Appl. Phys. 43; (2010); 7 pages.

* cited by examiner

Z-TYPE HEXAFERRITE HAVING A NANOCRYSTALLINE STRUCTURE

CROSS-REFERENCE TO RELATED APPLICATION

This application claims the benefit of U.S. Provisional Patent Application Ser. No. 62/979,526 filed Feb. 21, 2020. The related application is incorporated herein in its entirety by reference.

BACKGROUND

Improved performance and miniaturization are needed to meet the ever-increasing demands of devices used in very high frequency (VHF) applications, which are of particular interest in a variety of commercial and defense related industries. As an important component in radar and modern wireless communication systems, antenna elements with compact sizes are constantly being developed. It has been challenging however to develop ferrite materials for use in such high frequency applications as most ferrite materials exhibit relatively high magnetic loss at high frequencies. In general, hexagonal ferrites, or hexaferrites, are a type of iron-oxide ceramic compound that has a hexagonal crystal structure and exhibits magnetic properties. Several types of families of hexaferrites are known, including Z-type ferrites, $Ba_3Me_2Fe_{24}O_{41}$, and Y-type ferrites, $Ba_2Me_2Fe_{12}O_{22}$, where Me can be a small 2+ cation such as Co, Ni, or Zn, and Sr can be substituted for Ba. Other hexaferrite types include M-type ferrites ($(Ba,Sr)Fe_{12}O_{19}$), W-type ferrites ($(Ba,Sr)Me_2Fe_{16}O_{27}$), X-type ferrites ($(Ba,Sr)_2Me_2Fe_{28}O_{46}$), and U-type ferrites ($(Ba,Sr)_4Me_2Fe_{36}O_{60}$).

Some hexaferrites, such as cobalt-substituted barium Y-type ($Co_2Y$) and Z-type ($Co_2Z$) hexaferrites, can have much higher ferromagnetic resonance frequencies and permeabilities as compared to spinel ferrites, making them attractive in high frequency applications. Despite these improvements though, their use in high frequency and microwave devices is limited as these substitutions also result in an increase in the magnetic loss. While Z-type ferrites are a candidate for high impedance magneto-dielectric composites, the high magnetic loss limits their use. Improved Z-type ferrites are therefore desired.

BRIEF SUMMARY

Disclosed herein is $Co_2Z$ ferrite having a nanocrystalline structure.

In an aspect, a $Co_2Z$ ferrite has the formula: $(Ba_{1-x}Sr_x)_3Co_{2+y}M_yFe_{24-2y-z}O_{41}$. M is at least one of Mo, Ir, or Ru. The variable x can be 0 to 0.8, or 0.1 to 0.8. The variable y can be 0 to 0.8, or 0.01 to 0.8. The variable z can be −2 to 2. The $Co_2Z$ ferrite can have an average grain size of 5 to 100 nanometers, or 30 to 80, or 10 to 40 nanometers as measured using at least one of transmission electron microscopy, field emission scanning electron microscopy, or x-ray diffraction.

In another aspect, a composite comprises the $Co_2Z$ ferrite and a polymer.

In still another aspect, an article comprises the $Co_2Z$ ferrite.

In a further aspect, a method of making a $Co_2Z$ ferrite comprises milling ferrite precursor compounds comprising Fe, Co, Ba, and optionally M, wherein M is at least one of Mo, Ir, or Ru to form an oxide mixture; calcining the oxide mixture in an oxygen or air atmosphere to form a calcined ferrite; high energy milling the calcined ferrite at an energy sufficient to form the $Co_2Z$ ferrite having an average grain size of 5 to 100 nm, or 30 to 80 nm, or 10 to 40 nm as measured using at least one of transmission electron microscopy, field emission scanning electron microscopy, or x-ray diffraction.

The above described and other features are exemplified by the following figures, detailed description, and claims.

BRIEF DESCRIPTION OF THE DRAWINGS

The following figures are exemplary embodiments, which are provided to illustrate the present disclosure. The figures are illustrative of the examples, which are not intended to limit devices made in accordance with the disclosure to the materials, conditions, or process parameters set forth herein.

DETAILED DESCRIPTION

Figure 1:
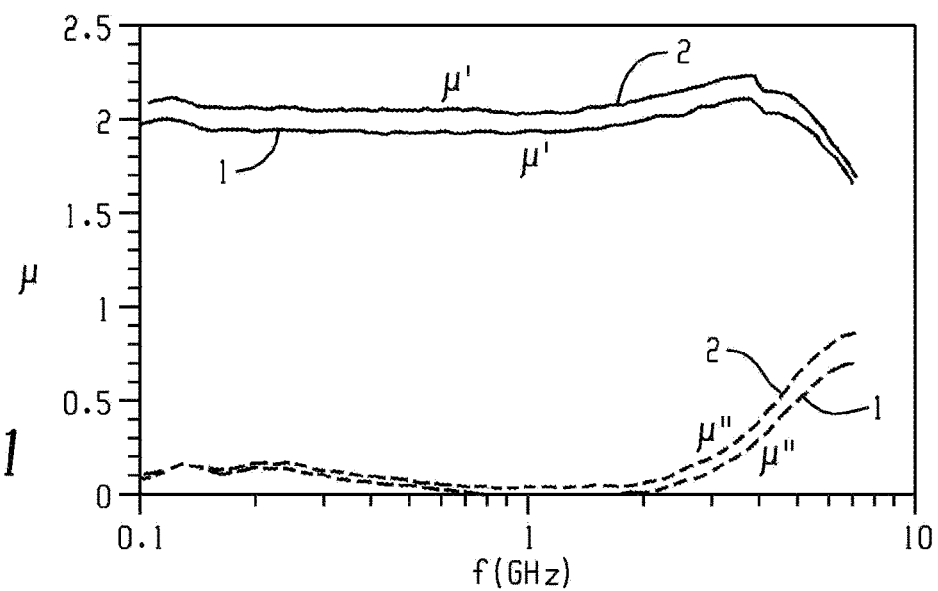
FIG. 1 is a graphical illustration of the permeability and magnetic loss tangent with frequency for Examples 1 and 2.

It was discovered that a Z-type hexaferrite having a nanocrystalline structure (herein referred to as a $Co_2Z$ ferrite or a nanocrystalline $Co_2Z$ ferrite) can result in a $Co_2Z$ ferrite with improved properties. Specifically, the nanocrystalline structure of the $Co_2Z$ ferrite can have an average grain size of 5 to 100 nanometers (nm), or 30 to 80, or 10 to 40 nm. As used herein the average grain size is measured using at least one of transmission electron microscopy, field emission scanning electron microscopy, or x-ray diffraction. The $Co_2Z$ ferrite can have the general formula:

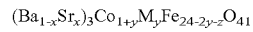

$(Ba_{1-x}Sr_x)_3Co_{1+y}M_yFe_{24-2y-z}O_{41}$ wherein M is at least one of Mo, Ir, or Ru; x is 0 to 0.8, or 0.1 to 0.8, or 0; y is 0 to 0.8, or 0.01 to 0.8; and z is −2 to 2. The variable x can be 0.1 to 0.8. The variable x can be 0. M can be at least one of Mo or Ru. The variable y can be 0. The variable y can be 0.01 to 0.8. The variable z can be modified as non-zero to include non-stoichiometric formulations.

The $Co_2Z$ ferrite can be prepared using any suitable method. Generally, the $Co_2Z$ ferrite can be formed by first forming a mixture comprising the precursor compounds including oxides of at least Ba, Co, Fe, and optionally M. The precursor compounds can comprise at least $BaCO_3$, $Co_3O_4$, and $Fe_2O_3$, and optionally $MO_2$. The mixture can comprise 5 to 20 weight percent of $BaCO_3$ based on the total weight of the precursor compounds. The mixture can comprise 5 to 50 weight percent of $MO_2$ based on the total weight of the precursor compounds. The mixture can comprise 2 to 15 weight percent of $Co_3O_4$ based on the total weight of the precursor compounds. The mixture can comprise 50 to 80 weight percent of $Fe_2O_3$ based on the total weight of the precursor compounds. The mixture can further comprise an oxide of at least one of Sr, Zn, Mg, or Cu. The oxides can have a particle size of 3 to 50 micrometers. The mixture can comprise an oxide of Sr. The mixture can then be milled to form an oxide mixture.

The milling of the precursor compounds can comprise a low energy milling to form the oxide mixture. As used herein, the term "low energy milling" refers to a milling step that imparts an energy sufficient to form the oxide mixture having an average particle size of 1 to 50 micrometers, or 0.5 to 20 micrometers. The low energy milling to form the oxide mixture can comprise dry milling or wet milling. The low energy milling can occur for less than or equal to 2 hours, or 0.5 to 1.5 hours. The low energy milling can comprise milling at a milling speed of less than or equal to 290 revolutions per minute (rpm), or 100 to 250 rpm. The low energy milling can comprise milling in a low energy ball mill. The low energy ball mill can comprise a plurality of metal balls (for example, hardened steel balls). The metal mixers can comprise metal balls having a diameter of 1 to 15 millimeters, or 5 to 20 millimeters, or 5 to 9 millimeters. A metal mixer to powder mass ratio in the low energy mill can be less than or equal to 15:1, or 12:1 to 5:1.

The oxide mixture can be calcined to form a calcined ferrite. The calcining can occur at a calcination temperature of 800 to 1,300 degrees Celsius (° C.). The calcining can occur for a calcination time of 0.5 to 20 hours, 1 to 10 hours, or 2 to 5 hours. The calcining can occur in air or oxygen. The ramping temperature up to and down from the calcining temperature can each independently occur at a ramp rate of 1 to 5° C. per minute.

The calcined ferrite can be ground via a high energy milling step to form the $Co_2Z$ nanocrystalline. As used herein, the term "high energy milling" refers to a milling step that imparts an energy sufficient to form the $Co_2Z$ nanocrystalline ferrite having the average particle size of 0.5 to 5 micrometers, wherein the $Co_2Z$ ferrite has an average grain size of 5 to 100 nanometers, or 30 to 80, or 10 to 40 nanometers as measured using at least one of transmission electron microscopy, field emission scanning electron microscopy, or x-ray diffraction. The average grain size can be measured using x-ray diffraction. The exact method of the high energy milling is not particularly limited where examples of high energy milling machines are generally known in the art. Examples of such high energy milling equipment include high energy ball mills (for example, a high energy horizontal planetary ball mill or an SPEX mill), vibrating mills, cryogenic grinders, or attrition mills, where one or more of these millers or combinations thereof can be used. In general, the high energy milling can comprise milling for greater than or equal to 4 hours, or 4 to 100 hours, or 5 to 20 hours. The high energy milling can comprise milling at a mixing speed of greater than or equal to 300 rpm, or 450 to 700 rpm, or 400 to 600 rpm.

The high energy milling can comprise milling in a high energy ball mill. The high energy ball mill can comprise a plurality of metal mixers (for example, hardened steel balls). The metal mixers can comprise balls having an average diameter of 5 to 20 millimeters, or 10 to 15 millimeters. A metal mixer to powder mass ratio of can be greater than or equal to 15:1, or 15:1 to 40:1, or 20:1 to 40:1.

After the high energy milling, the $Co_2Z$ ferrite particles can be post-annealed. The post-annealing can reduce internal stress and crystal defects, while tailoring a size of both particle and grain. The post-annealing can occur in an atmosphere comprising at least one of air or oxygen to help reduce the dielectric loss. Oxygen can be introduced to the annealing chamber at a flow rate of 0.1 to 10 liters per minute. The post-annealing can occur at an annealing temperature of 900 to 1,300° C., or 1,200 to 1,250° C. The post-annealing can occur for an annealing time of 1 to 20 hours, or 5 to 12 hours. The ramping temperature up to and down from the post-annealing temperature can each independently occur at a ramp rate of 1 to 5° C. per minute.

The final $Co_2Z$ ferrite can be in the form of particulates (for example, having a spherical or irregular shape) or in the form of platelets, whiskers, flakes, etc. A particle size of the particulate $Co_2Z$ ferrite can be 0.5 to 50 micrometers, or 1 to 10 micrometers. Platelets of the $Co_2Z$ ferrite can have an average maximum length of 0.1 to 100 micrometers and an average thickness of 0.05 to 1 micrometer. The $Co_2Z$ ferrite can have a nanocrystalline structure having the average grain size of 5 to 100 nm, or 20 to 150 nm, or 30 to 80 nm, or 10 to 40 nm.

The $Co_2Z$ ferrite particles can be used to make a composite, for example, comprising the $Co_2Z$ ferrite and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly (ethylene-tetrafluoroethylene (PETFE), or perfluoroalkoxy (PFA)), polyacetals (for example, polyoxyethylene and polyoxymethylene), poly($C_{1-6}$ alkyl)acrylates, polyacrylamides (including unsubstituted and mono-N- or di-N—($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) and polyether ketone ketones (PEKK)), polyarylene ketones, polyarylene sulfides (for example, polyphenylene sulfides (PPS)), polyarylene sulfones (for example, polyethersulfones (PES), polyphenylene sulfones (PPS), and the like), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N- or di-N—($C_{1-8}$ alkyl)acrylamides), polyolefins (for example, polyethylenes, such as high density polyethylene (HDPE), low density polyethylene (LDPE), and linear low density polyethylene (LLDPE), polypropylenes, and their halogenated derivatives (such as polytetrafluoroethylenes), and their copolymers, for example, ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, e.g. poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters, polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl) acrylate, a ($C_{1-6}$ alkyl) methacrylate, acrylonitrile, vinyl acetate, allyl acetate, triallyl cyanurate, triallyl isocyanurate, or acrylamide.

The polymer can comprise at least one of polyvinylidene fluoride (PVDF), polytetrafluoroethylene (PTFE), polyethylene (PE), high density polyethylene (HDPE), low density polyethylene (LDPE), polymethylmethacrylate (PMMA), polyether ether ketone (PEEK), or polyethersulfone (PES).

The $Co_2Z$ ferrite composite can comprise 5 to 95 volume percent, or 50 to 80 volume percent of the $Co_2Z$ ferrite based on the total volume of the $Co_2Z$ ferrite composite. The $Co_2Z$ ferrite composite can comprise 5 to 95 volume percent, or 20 to 50 volume percent of the polymer based on the total volume of the $Co_2Z$ ferrite composite. The $Co_2Z$ ferrite composite can be formed by compression molding, injection molding, reaction injection molding, laminating, extruding, calendering, casting, rolling, or the like. The composite can be free of a void space.

The $Co_2Z$ ferrite can have a planar easy magnetization (c-plane). A composite can comprise the $Co_2Z$ ferrite. The $Co_2Z$ ferrite composite can have at least one of a high permeability, a high operating frequency, or a low magnetic loss, making it suitable for use as an antenna or an inductor at S-L band frequency. The $Co_2Z$ ferrite composite can have a permeability of greater than or equal to 1.5, or greater than or equal to 1.8, or 1.5 to 5 at a frequency of 0.5 to 5 gigahertz, or at 0.5 to 3 gigahertz. The $Co_2Z$ ferrite composite can have a magnetic loss tangent tan $\delta_\mu$ of less than or equal to 0.04, less than or equal to 0.02, or 0.001 to 0.04 at a frequency of 0.5 to 5 gigahertz, or at 0.5 to 3 gigahertz. The $Co_2Z$ ferrite composite can have a permittivity of 6 to 15, or 3 to 8, or 8 to 12, or 8 to 10 at a frequency of 0.5 to 5 gigahertz, or at 0.5 to 3 gigahertz. The $Co_2Z$ ferrite composite can have a dielectric loss tangent tan $\delta_\varepsilon$ of less than or equal to 0.04, or less than or equal to 0.02, or 0.001 to 0.04 at a frequency of 0.5 to 5 gigahertz, or at 0.5 to 3 gigahertz. The $Co_2Z$ ferrite composite can have an operating frequency of 0.1 to 6 gigahertz, or 0.5 to 5 gigahertz, or at 0.5 to 3 gigahertz.

As used herein, magnetic and dielectric properties are measured in coaxial airline by vector network analyzer (VNA) using the Nicholson-Ross-Weir (NRW) method and the permeability and permittivity values are the relative permeability and the relative permittivity, respectively.

An article can comprise the $Co_2Z$ ferrite. The article can be an antenna or an inductor core. The article can be for use in the frequency 0.1 to 6 gigahertz range, or in the 0.5 to 5 gigahertz range. The article can be used for a variety of devices operable within the ultrahigh frequency range, such as a high frequency or microwave antenna, filter, inductor, circulator, or phase shifter. The article can be an antenna, a filter, an inductor, a circulator, or an EMI (electromagnetic interference) suppressor. Such articles can be used in commercial and military applications, weather radar, scientific communications, wireless communications, autonomous vehicles, aircraft communications, space communications, satellite communications, or surveillance.

The $Co_2Z$ ferrite can have the formula: $(Ba_{1-x}Sr_x)_3 Co_{2+y}M_yFe_{24-2y-z}O_{41}$ wherein M is at least one of Mo, Ir, or Ru; x is 0 to 0.8; y is 0 to 0.8, or 0.01 to 0.8; and z is −2 to 2; and wherein the $Co_2Z$ ferrite has an average grain size of 5 to 100 nanometers, or 30 to 80, or 10 to 40 nanometers as measured using at least one of transmission electron microscopy, field emission scanning electron microscopy, or x-ray diffraction. The variable y can be 0.01 to 0.8. The variable x can be 0.1 to 0.8. M can be at least one of Ru or Mo. The $Co_2Z$ ferrite can have a median D50 particle size by volume of 1 to 30 micrometers as measured using Horiba LA-910 laser light scattering PSD analyzer or as determined in accordance with ASTM D4464-15. A composite can comprise a polymer and the ferrite composition. The composite can have a permeability of greater than or equal to 1.5, or greater than or equal to 1.8, or 1.5 to 5 at a frequency of 0.5 to 5 gigahertz, or at 0.5 to 3 gigahertz. The composite can have a permittivity of 6 to 15, or 3 to 8, or 8 to 12, or 8 to 10 at a frequency of 0.5 to 5 gigahertz, or at 0.5 to 3 gigahertz. The composite can have a magnetic loss tangent tan $\delta_\mu$ of less than or equal to 0.04, less than or equal to 0.02, or 0.001 to 0.04 at a frequency of 0.5 to 5 gigahertz, or at 0.5 to 3 gigahertz. The composite can have a dielectric loss tangent tan $\delta_\varepsilon$ of less than or equal to 0.04, or less than or equal to 0.02, or 0.001 to 0.04 at a frequency of 0.5 to 5 gigahertz, or at 0.5 to 3 gigahertz. The polymer can comprise at least one of polyvinylidene fluoride (PVDF), polytetrafluoroethylene (PTFE), polyethylene (PE), high density polyethylene (HDPE), low density polyethylene (LDPE), polymethylmethacrylate (PMMA), polyether ether ketone (PEEK), or polyethersulfone (PES). An article can comprise the ferrite composition or the composite. The article can be an antenna, a filter, an inductor, a circulator, or an EMI suppressor.

The following examples are provided to illustrate the present disclosure. The examples are merely illustrative and are not intended to limit devices made in accordance with the disclosure to the materials, conditions, or process parameters set forth therein.

EXAMPLES

In the examples, the magnetic permeability of the resulting ferrite samples was measured in coaxial airline by vector network analyzer (VNA) using the Nicholson-Ross-Weir (NRW) method over a frequency of 0.1 to 10 GHz.

Example 1: Preparation of Composites Comprising a $Co_2Z$ Ferrite Composition with 7 Hours of High Energy Ball Milling and a 900° C. Post-Anneal A stoichiometric amount of $\alpha$-$Fe_2O_3$, $BaCO_3$, $SrCO_3$, $Co_3O_4$, and $MoO_2$ to form a $Co_2Z$ ferrite powder having the formula $Ba_{1.5}Sr_{1.5}Co_{2.12}Mo_{0.12}Fe_{22.16}O_{41}$ was dry milled in a planetary ball mill in 250 milliliter (mL) hardened chrome steel vials with 8 millimeter (mm) hardened chrome steel balls at a ball to powder mass ratio of 10:1 at a mixing speed of 250 rpm for 1 hour. The oxide mixture was calcined at a calcination temperature of 1,220° C. for a soak time of 4 hours in air with ramping and cooling rates of 5° C. per minute. The calcined ferrite was then crushed and screened by #40 sieve to result in a powder having D50 particle size by volume of less than 425 micrometers.

The calcined $Co_2Z$ ferrite having the formula $Ba_{1.5}Sr_{1.5}Co_{2.12}Mo_{0.12}Fe_{22.16}O_{41}$ was then milled in a high energy horizontal planetary ball mill to form a milled powder of the $Co_2Z$ ferrite. The mixing was performed in 500 mL hardened chrome steel vials with 10 mm hardened chrome steel balls at a ball to powder mass ratio of 30:1 at a milling speed of 500 rpm for 7 hours. The particle size of the resulting milled powder was measured using laser scattering to have a D50 value by volume of 0.5 to 5 micrometers. The milled powder was then post-annealed at 900° C. for 2 hours in air. The resultant $Co_2Z$ ferrite had an average grain size of 40 to 100 nanometers as determined using X-ray diffraction.

The $Co_2Z$ ferrite was mixed with a paraffin wax to form a composite comprising 69 vol % of the $Co_2Z$ ferrite. The composite was then molded into toroid shapes having an outer diameter of 7 millimeters, an inner diameter of 3 millimeters, and a wall thickness of 2 to 4 millimeters.

Figure 2:
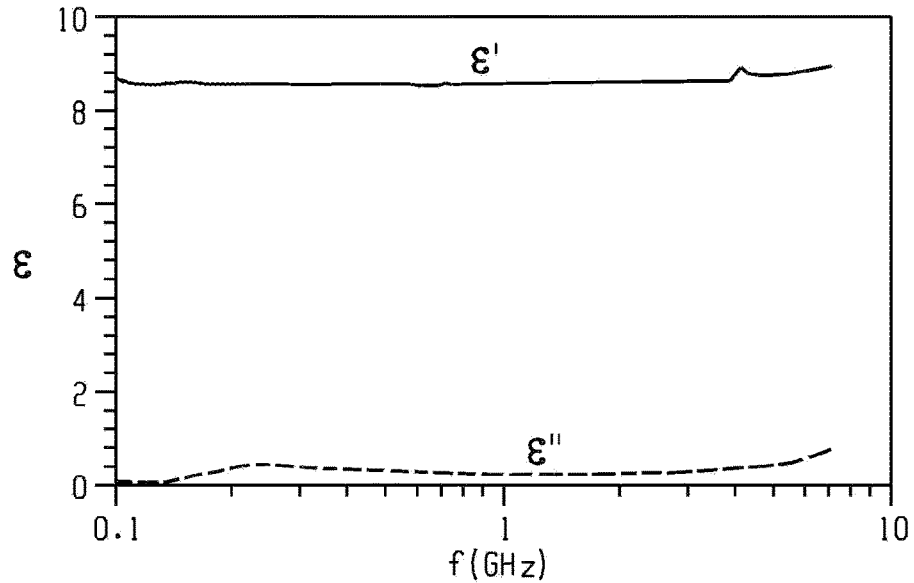
FIG. 2 is a graphical illustration of the permittivity and dielectric loss tangent with frequency for Example 1.

The magnetic properties are shown in Table 1 and FIG. 1 and the dielectric properties are shown in Table 1 and FIG. 2.

TABLE 1

| Magnetic Properties | | | Dielectric Properties | | |
| --- | --- | --- | --- | --- | --- |
| Example | 1 | 2 | Example | 1 | 2 |
| μ' at 0.5 GHz | 1.92 | 2.05 | ε' at 0.5 GHz | 8.57 | 8.60 |
| μ' at 1 GHz | 1.92 | 2.04 | ε' at 1 GHz | 8.57 | 8.63 |
| μ' at 1.6 GHz | 1.96 | 2.08 | ε' at 1.6 GHz | 8.58 | 8.65 |
| μ' at 2 GHz | 1.98 | 2.11 | ε' at 2 GHz | 8.59 | 8.66 |
| μ' at 3 GHz | 2.06 | 2.20 | ε' at 3 GHz | 8.60 | 8.67 |
| $tan\delta_\mu$ at 0.5 GHz | 0.029 | 0.027 | $tan\delta_\epsilon$ at 0.5 GHz | 0.037 | 0.034 |
| $tan\delta_\mu$ at 1 GHz | 0.003 | 0.009 | $tan\delta_\epsilon$ at 1 GHz | 0.030 | 0.026 |
| $tan\delta_\mu$ at 1.6 GHz | 0.010 | 0.012 | $tan\delta_\epsilon$ at 1.6 GHz | 0.031 | 0.026 |
| $tan\delta_\mu$ at 2 GHz | 0.013 | 0.025 | $tan\delta_\epsilon$ at 2 GHz | 0.032 | 0.027 |
| $tan\delta_\mu$ at 3 GHz | 0.066 | 0.088 | $tan\delta_\epsilon$ at 3 GHz | 0.037 | 0.032 |

Figure 3:
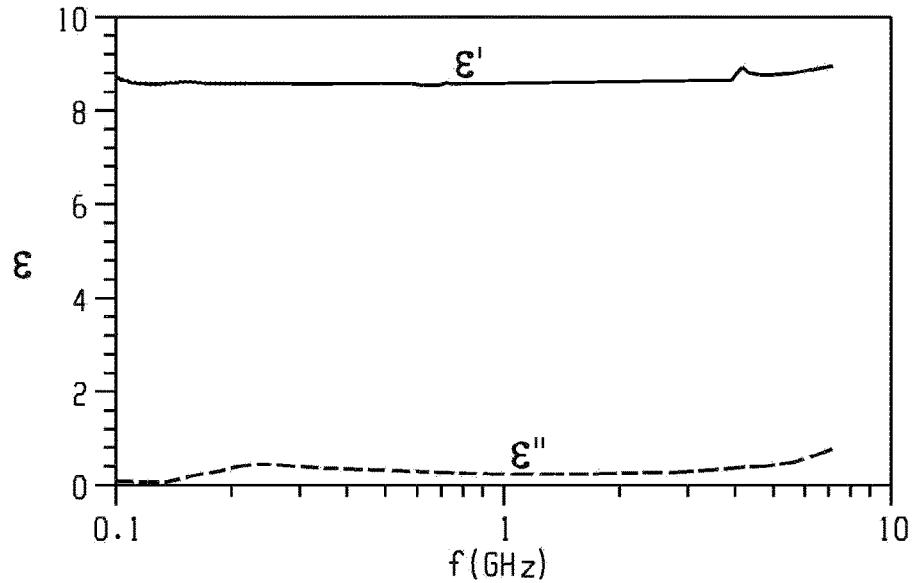
FIG. 3 is a graphical illustration of the permittivity and dielectric loss tangent with frequency for Example 2.

Example 2: Preparation of composites comprising a $Co_2Z$ ferrite composition with 5 hours high energy ball milling and a 900° C. post-anneal A $Co_2Z$ ferrite composite was prepared in accordance with Example 1 except that the high energy milling occurred for 5 hours instead of 9 hours. The magnetic properties are shown in Table 1 and FIG. 1 and the dielectric properties are shown in Table 1 and FIG. 3. The particle size of the resulting milled powder was measuring using laser scattering to have a D50 value by volume of 1 to 5 micrometers. The resultant $Co_2Z$ ferrite had an average grain size of 40 to 100 nanometers as determined using X-ray diffraction.

Examples 1 and 2 show that the ferrite composites can achieve good magnetic and dielectric properties over a wide range of frequencies.

Set forth below are non-limiting aspects of the present disclosure.

Aspect 1: A $Co_2Z$ ferrite having the formula: $(Ba_{1-x}Sr_x)_3Co_{2+y}M_yFe_{24-2y-z}O_{41}$ wherein M is at least one of Mo, Ir, or Ru; x is 0 to 0.8; y is 0 to 0.8, or 0.01 to 0.8; and z is −2 to 2; and wherein the $Co_2Z$ ferrite has an average grain size of 5 to 100 nanometers, or 30 to 80, or 10 to 40 nanometers as measured using at least one of transmission electron microscopy, field emission scanning electron microscopy, or x-ray diffraction. The $Co_2Z$ ferrite can have a median D50 particle size by volume of 1 to 30 micrometers as measured using Horiba LA-910 laser light scattering PSD analyzer or as determined in accordance with ASTM D4464-15.

Aspect 2: The $Co_2Z$ ferrite of aspect 1, wherein y is 0.01 to 0.8.

Aspect 3: The $Co_2Z$ ferrite of any of the preceding aspects, wherein x is 0.1 to 0.8.

Aspect 4: The $Co_2Z$ ferrite of any of the preceding aspects, M is at least one of Ru or Mo.

Aspect 5: A composite comprising a polymer and the ferrite composition of any of the preceding aspects.

Aspect 6: The composite of Aspect 5, wherein the composite has a permeability of greater than or equal to 1.5, or greater than or equal to 1.8, or 1.5 to 5 at a frequency of 0.5 to 5 gigahertz, or at 0.5 to 3 gigahertz.

Aspect 7: The composite of any of Aspects 5 to 6, wherein the composite has a permittivity of 6 to 15, or 3 to 8, or 8 to 12, or 8 to 10 at a frequency of 0.5 to 5 gigahertz, or at 0.5 to 3 gigahertz.

Aspect 8: The composite of any of Aspects 5 to 7, wherein the composite has a magnetic loss tangent $tan\delta_\mu$ of less than or equal to 0.04, less than or equal to 0.02, or 0.001 to 0.04 at a frequency of 0.5 to 5 gigahertz, or at 0.5 to 3 gigahertz.

Aspect 9: The composite of any of Aspects 5 to 8, wherein the composite has a dielectric loss tangent $tan\delta_\epsilon$ of less than or equal to 0.04, or less than or equal to 0.02, or 0.001 to 0.04 at a frequency of 0.5 to 5 gigahertz, or at 0.5 to 3 gigahertz.

Aspect 10: The composite of any of Aspects 5 to 9, wherein the polymer comprises at least one of polyvinylidene fluoride (PVDF), polytetrafluoroethylene (PTFE), polyethylene (PE), high density polyethylene (HDPE), low density polyethylene (LDPE), polymethylmethacrylate (PMMA), polyether ether ketone (PEEK), or polyethersulfone (PES).

Aspect 11: An article comprising the ferrite composition of any of Aspects 1 to 4 or the composite of any one of Aspects 5 to 10.

Aspect 12: The article of Aspect 11, wherein the article is an antenna, a filter, an inductor, a circulator, or an EMI suppressor.

Aspect 13: A method of making a $Co_2Z$ ferrite (for example, of any of Aspects 1 to 4) comprising: milling ferrite precursor compounds comprising Fe, Co, Ba, and optionally M, wherein M is at least one of Mo, Ir, or Ru to form an oxide mixture; calcining the oxide mixture in an oxygen or air atmosphere to form a calcined ferrite; high energy milling the calcined ferrite at an energy sufficient to form the $Co_2Z$ ferrite having a particle size of 1 to 30 micrometers and a nanocrystalline structure having an average grain size of 5 to 100 nm, or 30 to 80 nm, or 10 to 40 nm as measured using at least one of transmission electron microscopy, field emission scanning electron microscopy, or x-ray diffraction.

Aspect 14: The method of Aspect 13, wherein the high energy milling comprises mixing in at least one of a high energy ball mill, a vibrating mill, a cryogenic grinder, or an attrition mill.

Aspect 15: The method of any of Aspects 13 to 14, wherein the high energy milling comprises milling in a high energy ball mill. A ratio of the calcined ferrite to the balls can be greater than or equal to 15:1, or 15:1 to 40:1, or 20:1 to 40:1. An average diameter of the balls can be 5 to 20 millimeters, or 10 to 15 millimeters. The balls can comprise steel balls.

Aspect 16: The method of any of Aspects 13 to 15, wherein the high energy milling occurs for greater than or equal to 4 hours; or at a mixing speed of greater than or equal to 300 revolutions per minute.

Aspect 17: The method of any of Aspects 13 to 16, further comprising post-annealing the $Co_2Z$ ferrite in an oxygen or air atmosphere after the high energy milling. The post-annealing can occur at an annealing temperature of 900 to 1,300° C., or 1,200 to 1,250° C. The post-annealing can occur for an annealing time of 1 to 20 hours, or 5 to 12 hours.

Aspect 18: The method of any of Aspects 13 to 17, wherein the ferrite precursor compounds comprise $BaCO_3$, $Co_3O_4$, $Fe_2O_3$, and optionally $MO_2$.

Aspect 19: The method of any of Aspects 13 to 18, wherein the calcining the oxide mixture occurs at a calcining temperature of 1,000 to 1,300° C., or 1,200 to 1,250° C. and/or for a calcining time of 1 to 20 hours, or 5 to 12 hours.

Aspect 20: The method of any of Aspects 13 to 19, further comprising forming a composite comprising the $Co_2Z$ ferrite and a polymer.

Aspect 21: The $Co_2Z$ ferrite of any of the preceding aspects, wherein the $Co_2Z$ ferrite has a median D50 particle size by volume of 1 to 30 micrometers as measured using Horiba LA-910 laser light scattering PSD analyzer or as determined in accordance with ASTM D4464-15.

As used herein, the particle size refers to the median D50 particle size by volume and can be determined using Horiba LA-910 laser light scattering PSD analyzer or as determined in accordance with ASTM D4464-15.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A $Co_2Z$ ferrite having the formula:

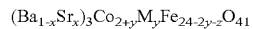

$$(Ba_{1-x}Sr_x)_3Co_{2+y}M_yFe_{24-2y-z}O_{41}$$

wherein M is at least one of Mo, Ir, or Ru; x is 0 to 0.8; y is 0 to 0.8; and z is −2 to 2; and wherein the $Co_2Z$ ferrite has an average grain size of 5 to 100 nanometers as measured using at least one of transmission electron microscopy, field emission scanning electron microscopy, or x-ray diffraction; and wherein
y is 0.01 to 0.8, or
x is 0.1 to 0.8, or
M is present and is at least one of Ru or Mo, or
the $Co_2Z$ ferrite has a median D50 particle size by volume of 1 to 30 micrometers as measured using Horiba LA-910 laser light scattering PSD analyzer or as determined in accordance with ASTM D4464-15, or
a combination thereof.

2. The $Co_2Z$ ferrite of claim 1, wherein y is 0.01 to 0.8.

3. The $Co_2Z$ ferrite of claim 1, wherein x is 0.1 to 0.8.

4. The $Co_2Z$ ferrite of claim 1, M is at least one of Ru or Mo.

5. The $Co_2Z$ ferrite of claim 1, wherein the $Co_2Z$ ferrite has a median D50 particle size by volume of 1 to 30 micrometers as measured using Horiba LA-910 laser light scattering PSD analyzer or as determined in accordance with ASTM D4464-15.

6. A composite comprising a polymer and the ferrite composition of claim 1.

7. The composite of claim 6, wherein the composite has a permeability of greater than or equal to 1.5 at a frequency of 0.5 to 5 gigahertz.

8. The composite of claim 6, wherein the composite has a permittivity of 6 to 15 at a frequency of 0.5 to 5 gigahertz.

9. The composite of claim 6, wherein the composite has a magnetic loss tangent tan $\delta_\mu$ of less than or equal to 0.04 at a frequency of 0.5 to 5 gigahertz.

10. The composite of claim 6, wherein the composite has a dielectric loss tangent tan $\delta_\varepsilon$ of less than or equal to 0.04 at a frequency of 0.5 to 5 gigahertz.

11. The composite of claim 6, wherein the polymer comprises at least one of polyvinylidene fluoride (PVDF), polytetrafluoroethylene (PTFE), polyethylene (PE), high density polyethylene (HDPE), low density polyethylene (LDPE), polymethylmethacrylate (PMMA), polyether ether ketone (PEEK), or polyethersulfone (PES).

12. A composite comprising:
a polymer comprising at least one of polyvinylidene fluoride (PVDF), polytetrafluoroethylene (PTFE), polyethylene (PE), high density polyethylene (HDPE), low density polyethylene (LDPE), polymethylmethacrylate (PMMA), polyether ether ketone (PEEK), or polyethersulfone (PES); and
a ferrite composition of having the formula:

$$(Ba_{1-x}Sr_x)_3Co_{2+y}M_yFe_{24-2y-z}O_{41}$$

wherein M is at least one of Mo or Ru; x is 0.1 to 0.8; y is 0.01 to 0.8; and z is −2 to 2; and
wherein the $Co_2Z$ ferrite has an average grain size of 5 to 100 nanometers as measured using at least one of transmission electron microscopy, field emission scanning electron microscopy, or x-ray diffraction.

13. An article comprising the ferrite composition of claim 1.

14. The article of claim 13, wherein the article is an antenna, a filter, an inductor, a circulator, or an EMI suppressor.

15. A method of making a $Co_2Z$ ferrite comprising:
milling ferrite precursor compounds comprising Fe, Co, Ba, and M, wherein M is at least one of Mo, Ir, or Ru to form an oxide mixture;
calcining the oxide mixture in an oxygen or air atmosphere to form a calcined ferrite;
high energy milling the calcined ferrite at an energy sufficient to form the $Co_2Z$ ferrite having a nanocrystalline structure having an average grain size of 5 to 100 nm as measured using at least one of transmission electron microscopy, field emission scanning electron microscopy, or x-ray diffraction.

16. The method of claim 15, wherein the high energy milling comprises milling in at least one of a high energy ball mill, a vibrating mill, a cryogenic grinder, or an attrition mill.

17. The method of claim 15, wherein the high energy milling comprises milling in a high energy ball mill; wherein at least one of:
a ratio of the calcined ferrite to the balls is greater than or equal to 15:1;
an average diameter of the balls is 5 to 20 millimeters; or
the balls comprise steel balls.

18. The method of claim 15, wherein the high energy milling occurs for greater than or equal to 4 hours; or at a mixing speed of greater than or equal to 300 revolutions per minute.

19. The method of claim 15, further comprising post-annealing the $Co_2Z$ ferrite in an oxygen or air atmosphere after the high energy milling; optionally at an annealing temperature of 900 to 1,300° C. for an annealing time of 1 to 20 hours; or wherein the calcining the oxide mixture occurs at a calcining temperature of 1,000 to 1,300° C. for a calcining time of 1 to 20 hours.

20. The method of claim 15, further comprising forming a composite comprising the $Co_2Z$ ferrite and a polymer.

* * * * *